United States Patent [19]
Hirohata et al.

[11] Patent Number: 4,505,567
[45] Date of Patent: Mar. 19, 1985

[54] ELECTROMAGNETICALLY DRIVEN SHUTTER WITH FOCUS ADJUSTING FUNCTION

[75] Inventors: Michio Hirohata; Takanori Kodaira, both of Tokyo, Japan

[73] Assignee: Canon Kabushiki Kaisha, Tokyo, Japan

[21] Appl. No.: 475,910

[22] Filed: Mar. 16, 1983

[30] Foreign Application Priority Data

Mar. 20, 1982 [JP] Japan .................................. 57-43716
Mar. 20, 1982 [JP] Japan .................................. 57-43717

[51] Int. Cl.³ ................................................ G03B 3/10
[52] U.S. Cl. .................................. 354/403; 354/195.1; 354/234.1
[58] Field of Search .................... 354/402, 403, 195.1, 354/234.1

[56] References Cited

U.S. PATENT DOCUMENTS

| | | | |
|---|---|---|---|
| 4,396,267 | 8/1983 | Hirohata et al. | 354/234.1 X |
| 4,401,378 | 8/1983 | Hirohata et al. | 354/195.1 |
| 4,456,360 | 6/1984 | Tamura | 354/402 X |
| 4,466,723 | 8/1984 | Ikari et al. | 354/234.1 X |

*Primary Examiner*—John Gonzales
*Attorney, Agent, or Firm*—Toren, McGeady and Stanger

[57] ABSTRACT

In the disclosed electromagnetically driven shutter a shutter release produces a first flow of current that electromagnetically moves a rotor coil arranged in a magnetic field to a position where it unlatches an automatic focusing operation and where it is locked to prevent backward motion. Termination of the focusing condition starts an exposure control arrangement and initiates a second current flow that moves the rotor coil further to control opening and closing of the shutter blades. Thus, two successive current flows coordinate the focus operation and the exposure.

8 Claims, 7 Drawing Figures

F I G.1
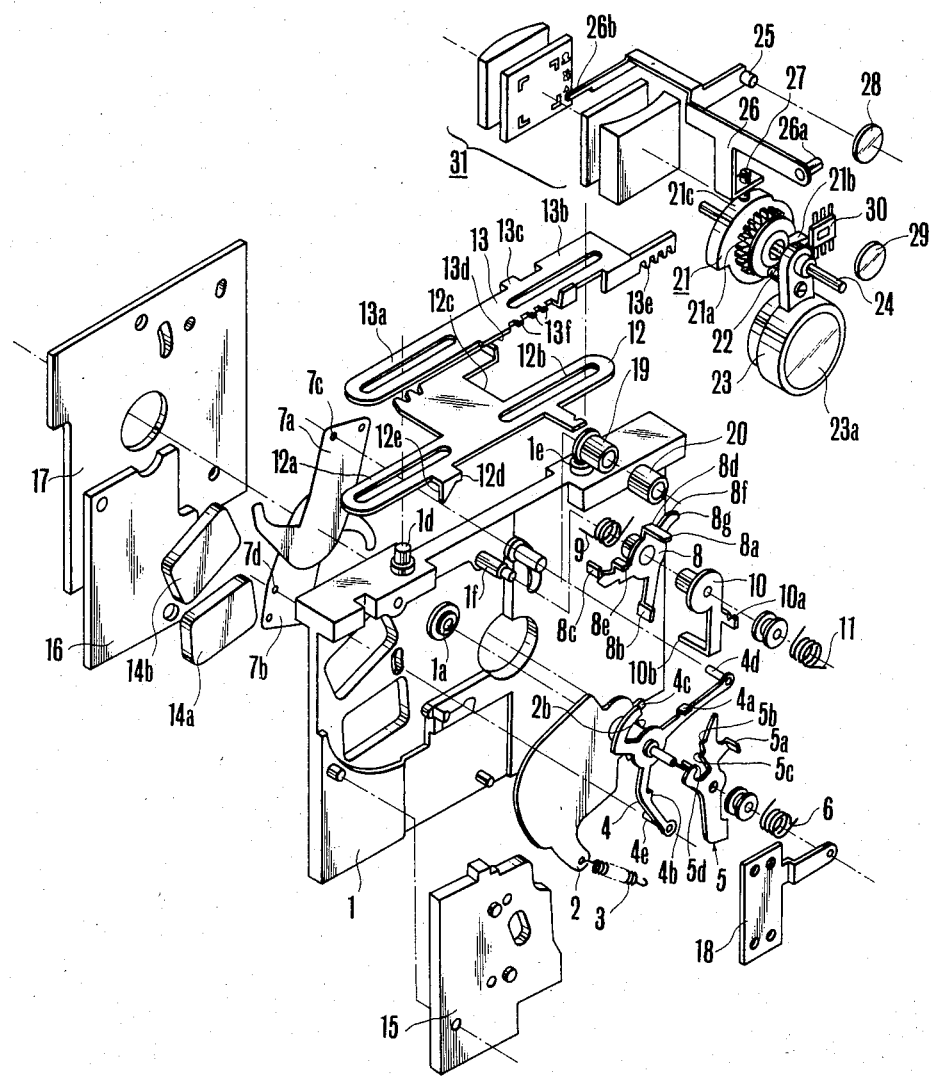

ELECTROMAGNETICALLY DRIVEN SHUTTER WITH FOCUS ADJUSTING FUNCTION

BACKGROUND OF THE INVENTION

1. Field of the Invention

This invention relates to an electromagnetically driven shutter in which a rotor is driven electromagnetically when a rotor winding arranged in a magnetic field is supplied with electric current and alternating movement of the rotor opens and closes the shutter blades.

2. Description of the Prior Art

In a known camera a single electromagnetic arrangement sequentially adjusts the focus by moving a photo-taking lens to a focus position in response to a sensor detecting an object distance and controls the exposure by varying the actuating time of the shutter blades on the basis of the object brightness and other exposure factors. Such a camera is, for example, disclosed in U.S. Pat. No. 4,355,872 and U.S. Pat. No. 4,243,309.

In such a conventional camera, a latch member stops the focus adjustment by engaging a focus adjusting control member. The focus adjusting and exposure controlling electromagnetic arrangement adjusts the focus with an electromagnet or solenoid that disengages the latch member from the control member with its electromagnetic force during the focus adjustment. Therefore, when the electromagnetic arrangement utilizes the rotor of an electromagnetically driven shutter of the type used in the prior art, a number of problems arise. Specifically, to assure a highly accurate and reliable focus adjustment it is necessary drastically to shorten the mechanical delay from the extinction of the electromagnetic force of the electromagnetic arrangement until the focus adjustment actually stops. This makes it necessary to bias the latch member with a relatively large resilient force. However, since it is far more difficult to increase the electromagnetic force of the rotor of an electromagnetically driven shutter than other electromagnetic devices, such as an electromagnet, solenoid, or the like, the increase in the strength of the resilient force of the latch member makes it difficult to prevent accidental actuation during the focus adjusting operation. Therefore, using the rotor of an electromagnetically driven shutter for the electromagnetic drive while leaving it unchanged from the device disclosed in the prior art may make it impossible to expect accurate control of the focus adjustment.

Of course, increasing the number of batteries loaded in the camera to increase the intensity of the current flowing into the rotor coil makes it possible to increase the electromagnetic force acting on the rotor to a level as high as that as other electromagnetic devices. However, this makes it impossible to limit the bulk and size of the camera to a minimum. Also, this is not a desirable means from the standpoint of conserving energy.

On the other hand, such an electromagnetically driven shutter can be made very thin along the axial direction of the photo-taking lens as compared with shutters using other electromagnetic drivers, such as electromagnets, solenoids or the like. Therefore, it is possible to construct a shutter of small overall size and to achieve an advance in the compactness of the camera. This results in a strong demand for development of an electromagnetically driven shutter capable of controlling the camera's focus adjusting operation.

SUMMARY OF THE INVENTION

An object of the present invention is to provide an improved electromagnetically driven shutter. In accordance with the invention, a coil arranged in a magnetic field drives a rotor in response to an electromagnetic force inducing current. A focus adjusting operation is initiated by a first alternating motion of the rotor, and termination of the focus adjusting operation and initiation and stop of an exposure operation are controlled by a second alternating motion of the rotor. This makes it possible to assure accurate and reliable control of the focus adjusting operation by means of the rotor without the need for increasing the driving force acting on the rotor.

These and other objects of the invention will become apparent from the following detailed description of embodiments thereof.

BRIEF DESCRIPTION OF THE DRAWINGS

FIG. 1 is an exploded perspective view of an embodiment of an electromagnetically driven shutter according to the present invention.

DETAILED DESCRIPTION OF THE PREFERRED EMBODIMENT

Figure 2A:
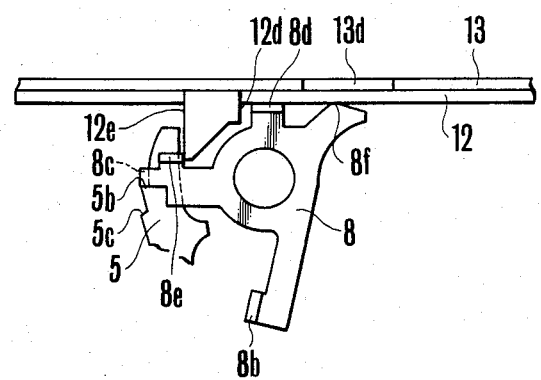
FIGS. 2(a) and 2(b) are elevational views of the shutter in the cocked position.

In FIG. 1, a shutter base plate 1 has a shaft 1a fixedly mounted thereon. A rotor 2 is pivotally fitted on the shaft 1a. A spring 3 urges the rotor 2 counterclockwise. On the surfaces of said rotor 2 are conduction coils (see FIG. 5) in the form of patterns. The shaft 1a also carries a sector lever 4 and a release lever 5 rotatable independently of each other and with respective spring suspensions 4a and 5a against which the ends of a spring 6 abut respectively, so that the sector lever 4 is urged clockwise, or in a direction to open shutter blades 7a and 7b. For this purpose, said shutter blades 7a and 7b are rotatable about pivot pins 1b and 1c (see FIG. 2(b)) on the shutter base plate 1 and have elongated slots 7c and 7d which engages pins 4d and 4e of the sector lever 4 respectively. A latch lever 8 is rotatably fitted on a shaft 1f which is mounted on the shutter base plate 1 and urged counterclockwise by a spring 9 so that its pawled portion 8c is engageable with a first pawled portion 5b or a second pawled portion 5c of the aforesaid release lever 5. A rotor holding lever 10 is rotatable about the common shaft of the latch lever 8 and urged in a clockwise by a spring 11 constrained between its spring suspension 10a and the spring suspension 8a of the latch lever 8 to abut on a pawled portion 8b of the latch lever 8. A set plate 12 and a charge slide 13 have respective elongated slots 12a, 12b, 13a and 13b which shafts 1d and 1e of the base plate 1 penetrate, and are urged by respective springs (not shown) to the left as viewed in FIG. 1 so that a pawled portion 13c of charge slide 13 is pressed against an abutment 12c of set plate 12. Magnets 14a and 14b carried on the base plate 1 are in contact with a rear yoke 16, and are spaced from a front yoke 15 by a predetermined distance. The two magnets 14a and 14b are magnetized along the plate thickness with their polarities oriented opposite each other, forming a magnetic circuit together with the front and rear yokes 15 and 16. The aforesaid rotor 2 is arranged in a space between the magnets 14a and 14b and the front yoke 15 so that when the conduction coil 2a is supplied with electric current, the magnetic flux of the magnets 14a and 14b interacts with it to produce a magnetomotive force which rotates the rotor 2 clockwise. Member 17 is a cover restraining the shutter blades 7a and 7b; 18 is a member supporting the shaft of the sector lever 4 and fixedly mounted on the front yoke 15; 19 and 20 are stoppers for limiting counterclockwise movement of the latch lever 8.

A rotary ring 21 has a lens focusing control cam 21b with its geared portion 21a engaging a rack 13e of the aforesaid charge slide 13 so that linear movement of the charge slide 13 is transmitted to rotative movement of the cam disc 21 which is then transmitted through an infinity adjusting screw 22 to axially move a lens barrel 23. The lens barrel 23 is suspended on a rod 24 to be movable forward or rearward. A spring (not shown) urges the lens barrel 23 rearward so that the position of the lens barrel 23 is determined by the focusing control cam 21b of the rotary ring 21 through the infinitely adjustable screw 22. The barrel suspending rod 24 is fixedly secured so as not to incline with respect to the optical axis by suitable means (not shown) as a matter of course. The lens barrel 23 contains a number of lens elements 23a and is adjusted in position so as to form a sharp image of an infinitely distant object at the start point.

Also provided in the rotary ring 21 is a range finding cam 21c for moving a holding lever 26 holding an IRED (Infrared light-emitting diode) 25 for object distance detection, and moves the holding lever 26 through a distance measurement adjusting screw 27.

The holding lever 26 is rotatable about a shaft 26a, urged by a spring (not shown) in a counterclockwise direction, and arranged to turn counterclockwise when the rotary ring 21 rotates counterclockwise as the charge lever 13 moves to the left. Member 28 is a projection lens for the IRED 25; 29 is a collection lens therefor; 30 is an SPC for receiving reflected light from an object to be photographed.

Also these parts constitute a so-called active type object distance detecting apparatus wherein the light from the IRED 25 is projected by the lens 28 onto the object and the reflected light from the object is focused again on the SPC 30 by the collection lens 29. Since, however, its operation is very well known to those skilled in the art, no further detailed explanation is given here. An indication needle 26b provided on the holding lever 26 performs a distance display in an Albada finder 31.

The aforesaid charge lever 13 is further provided with a plurality of distance pawls 13f and an extension 13d on the left side thereof. As has been stated above, as the charge lever 13 runs, when the lens barrel 23 has reached an in-focus position as predetermined by the focusing control cam 21b of the rotary ring 21, the aforesaid latch lever pawl 8g engages one of the aforesaid distance pawls 13f to arrest the charge lever 13.

The lens barrel 23 when in the cocked position is focused on the closest distance, and then as the charge lever 13 moves to the left, focuses on longer object distances. The geared portion 21a of the rotary ring 21 is connected through a gear train (not shown) to a governor so that the time the leftward movement of the charge lever 13 by about 8 mm takes is controlled as accurately as on the order of 100 milliseconds.

Figure 5:
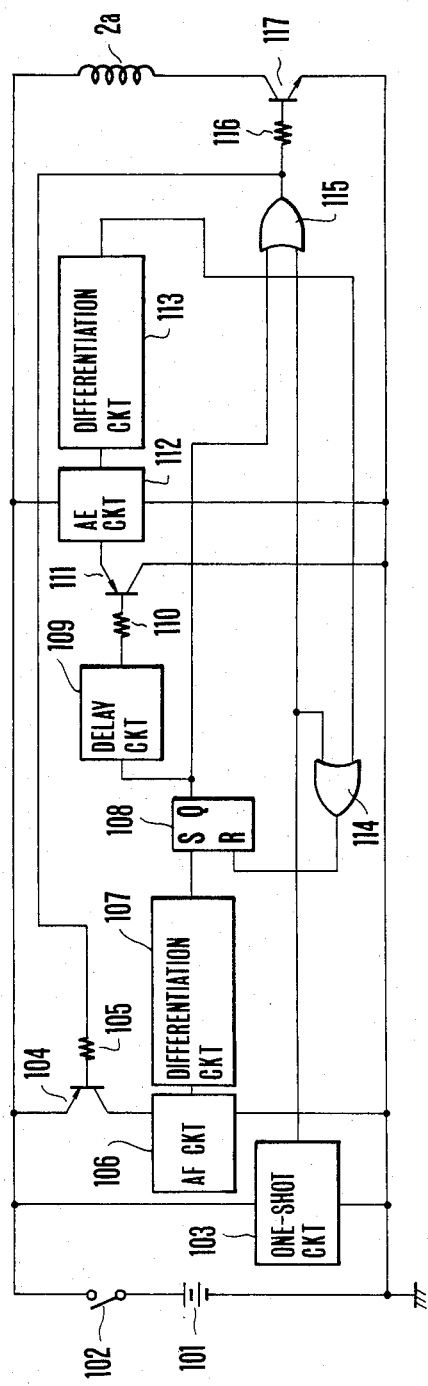
FIG. 5 is an electrical circuit diagram of a control circuit for the shutter.

In the control circuit of FIG. 5, member 101 is an electrical power source or battery; 102 is a switch arranged to turn on in response to actuation of a camera release. By the turning on of this switch 102, current supply to the entire circuit is started. A one-shot circuit 103 whose output goes high for a predetermined time (relatively short time) from the time of start of the current supply is constructed of, for example, a monostable multibivrator. A range detecting circuit 106 (hereinafter referred to as "AF" circuit) is connected through a PNP transistor 104 to the switch 102 upon start of the current supply to light on the IRED 25, and upon detection of a peak of the reflected light from the object sensed by the SPC 30 to change its output from low level to high level. The output of this AF circuit 106 is connected through a differentiation circuit 107 to a "set" input of a set-reset flip-flop (hereinafter described as RS-FF) 108.

The Q output of RS-FF 108 is connected to an OR gate 115, and through a delay circuit 109 and a resistor 110 to the base of a PNP transistor 111. A exposure control circuit 112 (hereinafter described as "AE" circuit) is of known construction and has a light sensitive element (not shown) receptive of light from the object to be photographed for producing brightness information. When counter (not shown) responds to attainment of the brightness information of a prescribed level representing a correct exposure can be obtained its output from low to high level, the transistor 111 turns off, and the counting operation starts. An OR gate 114 has two inputs, one of which is connected to the output of the one-shot circuit 103, and the other of which is connected to the output of the AE circuit 112 through a differentiation circuit 113, and has an output which is applied to reset the RS-FF 108.

Another OR gate 115 to which the Q output of RS-FF 108 is applied also has two inputs, the opposite input being connected to the output of the one-shot circuit 103. 117 is an NPN transistor 117 controls current supply to the coil 2a with its base connected through a resistor 116 to the output of the OR gate 115. Also connected to the output of OR gate 115 is the base of transistor 104 through a resistor 105.

The operation of the shutter of such construction is as follows.

When the camera is being wound, the set plate 12 is moved by means (not shown) to the right from a first position where the right hand end of the slot 12b abuts the pin 1e, and the pawl 12d on the set plate 12 in contact with the pawl 8d of the latch lever 8 turns the latter clockwise until another pawl 8c is caught by the first pawl 5b of release lever 5. On the other hand, since the recess 12c of the set plate 12 is in contact with the pawl 13c of charge slide 13, the latter moves to the right along with the set plate 12, while rotating the rotary ring 21 clockwise so the lens barrel 23 is moved axially to effect focusing down to shorter object distances, and, at the same time, the holding lever 25 is turned clockwise to charge the AF mechanism. When the film winding operation is completed, as illustrated in FIG. 2(a), the set plate 12 with its pawl 12e pressed against the pawl 8e of latch lever 8 is thus latched in a second or set position, and the set plate 12 and the charge slide 13 are held.

Figure 2B:
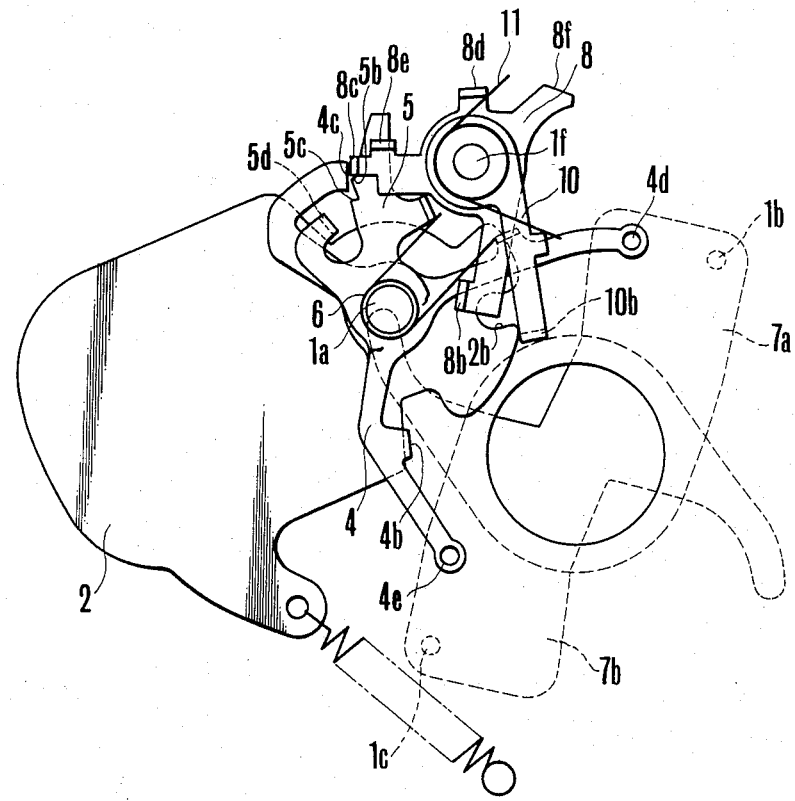

When the latch lever 8 turns clockwise, the rotor holding lever 10 abutting on the pawl 8b of latch lever 8 is hindered in its rotation by the pawl 10b contacting the rotor 2, taking the position shown in FIG. 2(b).

Figure 3A:
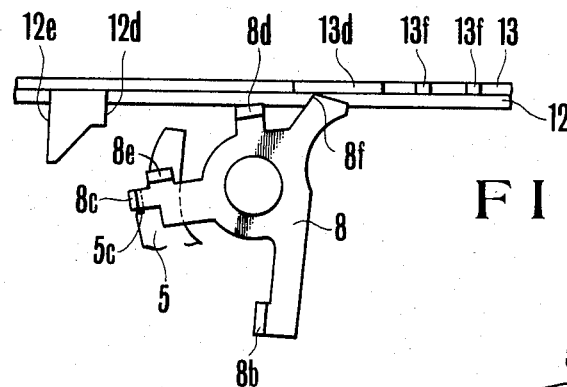
FIGS. 3(a) and 3(b) are similar to FIG. 2 except that an initiation of the focus adjusting operation is illustrated.

From this state, actuation of a camera release follows to turn on the switch 102. Since the output of one-shot circuit 103 then changes to high, the outputs of OR gates 114 and 115 become high, resetting RS-FF 108, and turning on transistor 117. Thus a current supply to the coil 2a starts. At this time, transistor 104 is also turned off by the output of OR gate 115, leaving the AF circuit 106 unenergized. Therefore, IRED 25 is not yet lit. Upon current supply to the coil 2a, an electromagnetic force is produced in coil 2a, and the rotor 2 is driven clockwise against the bias force of spring 3 and its one side edge strikes the pawl 5d of release lever 5. As a result the release lever 5 rotates clockwise with the rotor 2 so that the first pawl 5b of the release lever 5 is disengaged from the pawl 8c of latch lever 8. Then, the latch lever 8 turns counterclockwise under the action of spring 9. Hence, the pawl 8e of latch lever 8 is moved away from the pawl 12e of set plate 12. Then the set plate 12 returns to the aforesaid first position due to the force of a spring (not shown), the charge slide 13 is released from the latching connection, and the rotary ring 21 starts to rotate. However, the charge slide 13 moves slowly by virtue of the governor cooperating with the rotary ring 21. Hence the latch lever 8 is held stationary for a time in the position where the pawl 8f abuts against the projecting portion 13d of the charge slide 13 as illustrated in FIG. 3(a).

Figure 3B:
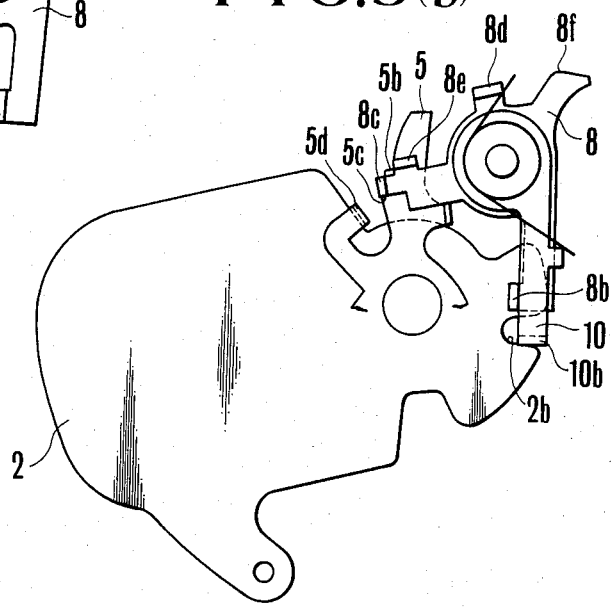

By this time, the output of one-shot circuit 103 is changed from high to low again where the current supply to the coil 2a is stopped, and the AF circuit 106 is rendered operative with the IRED 25 lit. Such termination of current supply to coil 2a causes the rotor 2 to return by the spring 3 and the release lever 5 to return in response to the spring 6, thus bringing its 2nd pawl 5c into engagement with the pawl 8c of latch lever 8. On the other hand, the above-described clockwise movement of rotor 2 results in the pawl 10b of rotor holding lever 10 which has so far been in contact with rotor 2 entering a grooved portion 2b of rotor 2. Hence it is when the first current supply from the output of one-shot circuit 103 is stopped that, as illustrated in FIG. 3(b), the rotor 2 is held in a position where it is in contact with the pawl 10b of the holding lever 10. This position is located slightly counterclockwise ahead of the position where the rotor 2 touches the pawl 5d of release lever 5. It is to be noted that though the clockwise movement of the rotor 2 by the first current supply results in taking the sector lever pawl 4b out of contact with the rotor, it is in the position of FIG. 2(b) that another pawl 4c comes into abutting engagement on the pawl 8c of latch lever 8 so that the sector lever 4 is hindered from further rotation. Therefore an exposure operation is not yet carried out by the shutter blades 7a and 7b. It is also noted that in this position the rotor holding lever 10 is in contact with the latch lever pawl 8b.

Figure 4:
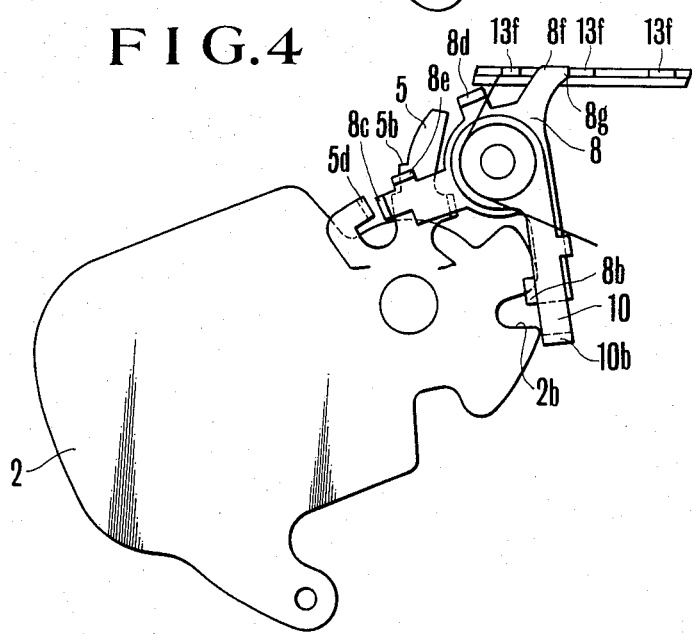
FIG. 4 is similar to FIG. 3 except that a termination of the focus adjusting operation is illustrated.

As the charge slide 13 continues to return at a slow speed while axially moving the lens barrel 23, the projected light from the IRED 25 on the holding lever 26 scans the target area. When that projected light comes onto and is reflected therefrom, the output of SPC 30 reaches a peak value at which the output of AF circuit 106 is inverted from low to high. At this time, therefore, the differentiation circuit 107 produces a pulse signal of high level which is then applied to set RS-FF 108. Hence the Q output of RS-FF 108 is changed to high, and, therefore, the output of OR gate 115 goes high again. Thus a second current supply to coil 2a starts, and at the same time the AF circuit 106 is no longer supplied with current. This second current supply to coil 2a turns the rotor 2 clockwise from the position held by the lever 10 shown in FIG. 3(b), immediately coming into abutment on the release lever pawl 5d. After that, the release lever 5 turns along with the rotor 2. Therefore, the release lever pawl 5c is disengaged from the latch lever pawl 8c permitting the latch lever 8 to turn counterclockwise until the position shown in FIG. 4 by the force of spring 9.

It is to be noted that because the stroke of the rotor 2 from this time until the rotor 2 touches the pawl 5d is shorter than during the first current supply, the release lever 5 can be actuated in about 3 to 4 msec.

As the latch lever 8 turns counterclockwise, the arresting pawl 8g is put into one of the detent slots 13f of charge slide 13, and the latter is stopped from further movement. Thus the lens barrel 23 whose position has been ever changing as the charge lever 13 has been moving is adjusted to the in-focus position. At this time, the rotor holding lever 10 also turns counterclockwise in driven connection with the latch lever 8 and the pawl 10b is retracted from the groove portion 2b of rotor 2. It is to be noted that the time such operation takes is about 5 to 7 msec. It takes about 15 to 18 msec. until the initiation of an exposure to be described later. The amount the shutter blades 7a and 7b are overlapped is adjusted to take this time into account.

The counterclockwise movement of the latch lever 8 also causes disengagement of the pawl 8c from the pawl 4c of sector lever 4. By this time, the sector lever 4 turns clockwise due to the action of the spring 6, while following up rotation of the rotor 2. Thereby the shutter blades 7a and 7b start to open. As has been stated above, in 15 to 18 msec. from the start of the second current supply to coil 2a, an exposure of the film is initiated. On the other hand, after a predetermined time from the time at which the Q output of RS-FF 108 changes to high (in fact, after the time the opening operation of the shutter blades 7a and 7b takes to actually start the exposure has elapsed), the output of the delay circuit 109 becomes high. Responsive to this, transistor 111 turns off, thereupon the AE circuit 112 starts counting the light value information almost in synchronism with the start of the exposure. Then, when the light metering information is counted to a prescribed value, the output of AE circuit 113 inverts from low to high. Therefore, RS-FF 108 receives a reset pulse through the differentiation circuit 113 and OR gate 114 and changes its Q output to low level. Hence the output of OR gate 115 becomes low, and this turns off the transistor 117. Thus the current supply to coil 2a is terminated.

By the de-energization of the coil 2a, the rotor 2 starts to rotate counter-clockwise due to the action of the spring 3, and its one side edge pushes the pawl 4b of sector lever 4 thereby turning the sector lever counter-clock-wise against the spring 6. Hence the shutter blades 7a and 7b start being closed, so as to terminate the exposure.

As has been described in greater detail, the present invention results in initiation and a termination of the focus adjusting operation to be done at the starts of the two supplies of current to the coil so that there is no need of continuing the current supply to the electromagnetic means during the focus adjusting operation as in the conventional device. That is, according to the present invention, the electromagnetic force of the electromagnetic means is not used for holding the latch member for terminating the focus adjusting operation. Therefore, even when the electromagnetic means is in the form of a rotor of an electromagnetically driven shutter or the like and provides only a relatively small electromagnetic force, the focus adjusting operation and the exposure operation can be controlled very accurately and reliably.

Also, according to the present invention, the current supply to the focus detecting circuit is stopped when the coil is being energized. Thus even when the current supplying condition to the coil happens to change during the focus adjusting operation and result in production of noise from the coil, there is no possibility of a malfunction of the focus detecting circuit by that noise. Also from the aforementioned the coil and IRED which require large current are not necessarily simultaneously supplied with current so that rapid consumption of electrical energy which would otherwise occur càn be avoided. According to the present invention, the rotor of the electromagnetically driven shutter can control even the focus adjusting operation with high accuracy and reliability.

What we claim:

1. An electromagnetically driven shutter comprising:
   (a) a coil, means for producing a magnetic field, a rotor driven by an electromagnetic force exerted on said coil arranged in the magnetic field;
   (b) focus adjusting means for performing a focus adjusting operation with focusing movement in a predetermined direction;
   (c) latch means for latching said focus adjusting means, said latch means when moved from a first position to a second position being arranged for releasing said focus adjusting means from a latching connection, and when moved from the second position to a third position latching said focus adjusting means again; and
   (d) holding means capable of holding said latch means in the first and second positions, said holding means being arranged for releasing the hold on said latch means in response to forward movement of said rotor, and for holding said latch means in the second position in response to termination of a first reciprocating motion of said rotor.

2. An electromagnetically driven shutter according to claim 1, wherein said coil is fixedly secured to said rotor.

3. An electromagnetically driven shutter according to claim 2, further comprising:

(e) transmission means for transmitting the alternating motion of said rotor to shutter blades of said shutter in response to start of a second reciprocating motion of said rotor.

4. An electromagnetically driven shutter according to claim 3, further comprising:
   (f) first current supply control means for supplying current to said coil for a predetermined time in response to actuation of a camera release; and
   (g) second current supply control means for initiating a current supply to said coil in response to output of said focus adjusting means and for terminating the current supply to said coil in response to output of an exposure control circuit.

5. An electromagnetically driven shutter according to claim 4, further comprising:
   (h) switching means for prohibiting current supply to said focus adjusting means when said coil is being supplied with current.

6. An electromagnetically driven shutter according to claim 5, wherein said focus adjusting means has a light projection element.

7. An electromagnetically driven shutter comprising:
   (a) a rotor driven by an electromagnetic force exerted on a coil arranged in a magnetic field;
   (b) first current supply control means for supplying said coil with current for a predetermined time in response to actuation of a camera release;
   (c) second current supply control means for initiating a current supply to said coil in response to output of a focus detecting circuit, and for terminating the current supply to said coil in response to output of an exposure control circuit;
   (d) latch means arranged to move in a predetermined direction as said rotor moves forward when the current supply to said coil is controlled by said first current supply control means so that a focus adjusting operation is initiated, and to further move in a predetermined direction of said rotor moves forward when the current supply to said coil is controlled by said second current supply control means so that the focus adjusting operation is terminated; and
   (e) transmission means for transmitting an alternating motion of said rotor to blades of said shutter when the current supply to said coil is controlled by said second current supply control means.

8. An electromagnetically driven shutter according to claim 7, further comprising:
   (f) switching means for prohibiting current supply to said focus detecting circuit when said coil is being supplied with current.

* * * * *